US012544777B2

(12) United States Patent
Schnittger et al.

(10) Patent No.: US 12,544,777 B2
(45) Date of Patent: Feb. 10, 2026

(54) HVLP SPRAY UNIT

(71) Applicant: J. Wagner GmbH, Mardorf (DE)

(72) Inventors: Thorsten Schnittger, Friedrichshafen (DE); Björn Freisinger, Krauchenwies (DE)

(73) Assignee: J. WAGNER GmbH, Markdorf (DE)

( * ) Notice: Subject to any disclaimer, the term of this patent is extended or adjusted under 35 U.S.C. 154(b) by 341 days.

(21) Appl. No.: 18/169,404

(22) Filed: Feb. 15, 2023

(65) Prior Publication Data

US 2023/0264213 A1 Aug. 24, 2023

(30) Foreign Application Priority Data

Feb. 18, 2022 (DE) ........................ 10 2022 103 866

(51) Int. Cl.
*B05B 7/24* (2006.01)
*B05B 7/00* (2006.01)

(52) U.S. Cl.
CPC .......... *B05B 7/2408* (2013.01); *B05B 7/0081* (2013.01); *B05B 7/2435* (2013.01)

(58) Field of Classification Search
CPC ... B05B 7/2408; B05B 7/0081; B05B 7/2435; B05B 1/3046; B05B 7/0815
See application file for complete search history.

(56) References Cited

U.S. PATENT DOCUMENTS

| | | | | |
|---|---|---|---|---|
| 5,180,104 A * | 1/1993 | Mellette | B05B 7/0081 | 239/296 |
| 2010/0308134 A1* | 12/2010 | Bunnell | B05B 7/0815 | 239/398 |
| 2015/0283568 A1* | 10/2015 | Abt | B05B 7/0081 | 137/505.36 |

FOREIGN PATENT DOCUMENTS

| | | |
|---|---|---|
| CN | 202174020 U | 3/2012 |
| DE | 202015106132 U1 | 11/2015 |

OTHER PUBLICATIONS

Office Action for German Patent Application No. 10 2022 103 866.1 dated Sep. 30, 2022, 6 pages.

* cited by examiner

*Primary Examiner* — Qingzhang Zhou
*Assistant Examiner* — Joel Zhou
(74) *Attorney, Agent, or Firm* — Christopher J. Volkmann; KELLY, HOLT & CHRISTENSON PLLC

(57) ABSTRACT

A HVLP spray unit with an electric fan comprising a needle valve for metering the paint which is fed to an air cap, the needle valve comprising a valve body with an elongate interior space, a valve needle, a compression spring and a seal, the interior space between the seal and a nozzle opening of the valve body being configured as a paint chamber, into which a feed channel for the paint opens and which is flowed through by the paint during spray operation of the HVLP spray unit. Here, the interior space of the valve body is tapered between the feed channel and the seal in such a way that a needle guide is formed, and that, in a manner which lies opposite the paint chamber, the seal is arranged so as to bear against the needle guide.

18 Claims, 4 Drawing Sheets

HVLP SPRAY UNIT

CROSS-REFERENCES TO RELATED APPLICATION

This application claims the benefit of German Application No. 10 2022 103 866.1, filed Feb. 18, 2022.

FIELD OF THE DISCLOSURE

The present disclosure relates to an HVLP spray unit according to the precharacterizing clause of claim 1.

DETAILED DESCRIPTION

Figure 1:
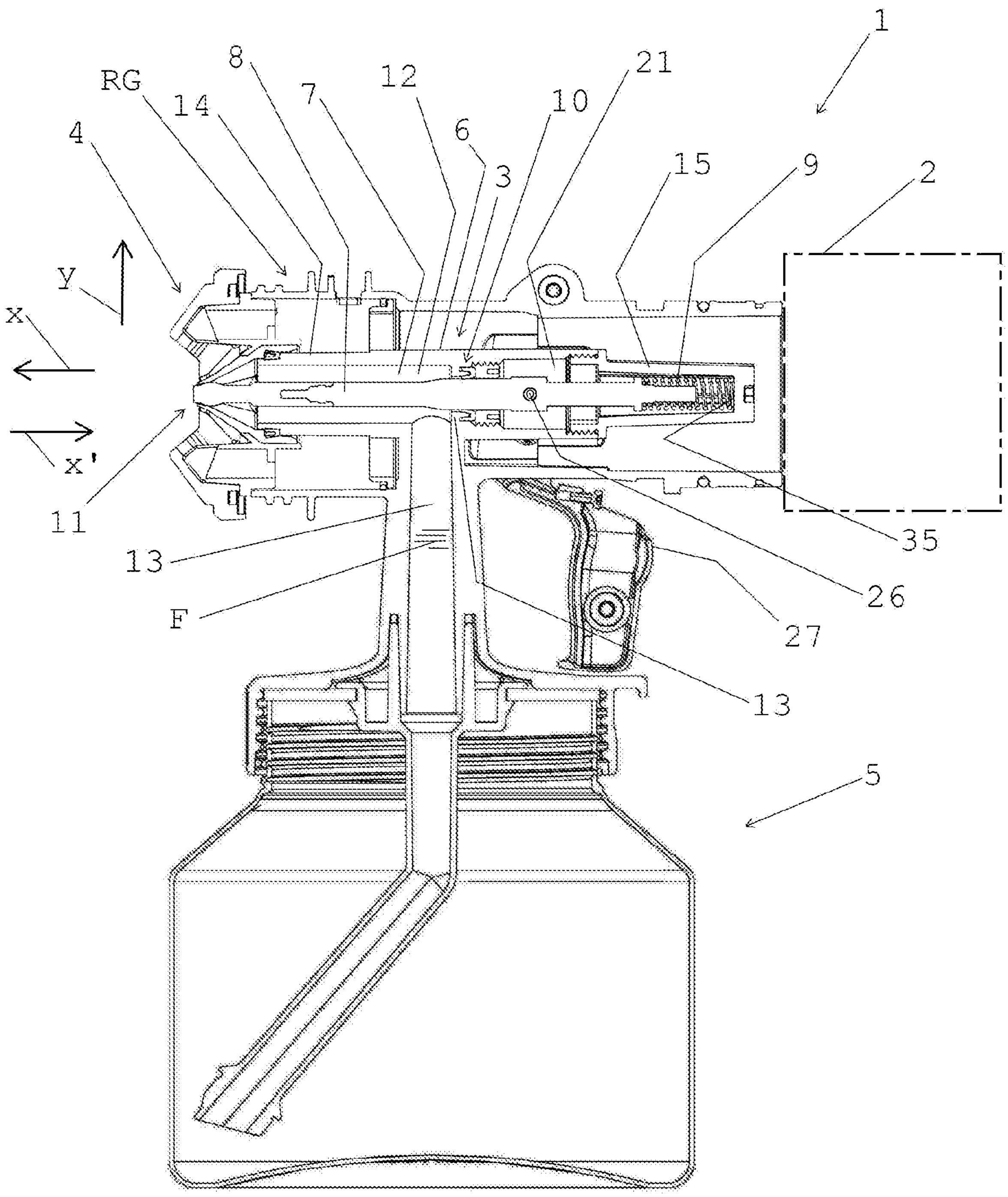
FIG. 1 shows a diagrammatic sectional illustration of an HVLP spray unit according to one example, in which illustration sectioned surfaces are not hatched in order to preserve the clarity.

CN202174020U has disclosed an electric spray gun with a valve needle which can be dismantled and washed rapidly.

It is an object of the present disclosure to propose a HVLP spray unit, in the case of which not only a replacement and/or cleaning of the valve needle and/or the seal can be carried out simply, but rather in the case of which the sealing action of the valve needle can be reestablished in high quality simply and rapidly.

Proceeding from the features of the precharacterizing clause of claim 1, this object is achieved by way of the characterizing features of claim 1. Advantageous and expedient refinements are specified in the subclaims.

The HVLP spray unit according to the present disclosure with an electric fan comprises a needle valve for metering the paint which is fed to an air cap, the needle valve comprising a valve body with an elongate interior space, a valve needle, a compression spring and a seal, the interior space between the seal and a nozzle opening of the valve body being configured as a paint chamber, into which a feed channel for the paint opens and which is flowed through by the paint during spray operation of the HVLP spray unit, the interior space of the valve body being tapered between the feed channel and the seal in such a way that a needle guide is formed, and, in a manner which lies opposite the paint chamber, the seal being arranged so as to bear against the needle guide. By way of a defined interaction of the seal and the needle guide, the seal can be mounted in an accurate location in the interior space of the valve body and can therefore also be positioned reproducibly in relation to the valve needle.

It is also provided for the valve body to be configured with a circumferential collar in order to form the needle guide in its interior space. A collar of this type can both be produced simply using the injection molding method, and can also be mounted simply as an installation part.

It is also provided for the valve body to be configured with a circumferential flange in order to form the needle guide, the flange being configured in the form of a tube end on an end surface of the collar, the end surface facing away from the paint chamber. An interaction, predefined in terms of its function, with the seal is possible by way of a needle guide of this type.

Furthermore, it is provided for an annularly circumferential receptacle to be configured by way of the needle guide. As a result, the mounting of the seal the wrong way round is precluded.

It is also provided for the seal to be arranged between a securing element and the needle guide, and for the seal to be squeezed between the securing element and the needle guide. As a result, the seal is held securely in its provided position, and it is reliably avoided that the seal is removed from the flange during withdrawal of the needle.

Furthermore, it is provided for the securing element to be supported on an inner shell surface of the interior space of the valve body, the support taking place, in particular, by way of a positively locking connection, and the securing element being screwed, in particular, into the valve body, and it preferably being provided that the inner shell surface of the interior space has an internal thread behind the needle guide, and that the securing element has an external thread which fits the internal thread. Support of this type is reliable and at the same time also allows the use of seals of different lengths, with the result that a multiplicity of seals can come into question as replacement parts, and the procurement of replacement parts is thus facilitated.

It is also provided for the valve body to be of multiple-part configuration, the valve body comprising a front part housing which supports the air cap with the nozzle opening and, in particular, also comprises the needle guide, and the valve body comprising a rear part housing, in which, in particular, the compression spring is received, it being possible for the two part housings to be separated from one another in the axial direction in such a way that after the removal of the rear part housing the valve needle can be pulled out of the front part housing with a seal mounted, and the two part housings being screwed to one another, in particular. A valve body of this type permits both rapid dismantling and rapid assembly. As a result of an interaction of the rear part housing with the front part housing with a compression spring mounted in between, it is also possible to check the assembly by way of the resistance which builds up increasingly during screwing together as a result of the compression spring.

Furthermore, it is provided for the seal to be configured in the manner of a shaft seal with a circumferential groove, the groove opening to one of two end sides of the seal, the end sides lying between an inner bearing surface of the seal and an outer bearing surface of the seal. A seal of this type is available as a standard component and is suitable for interaction with the needle guide.

It is also provided for the seal to be seated with an outer web in the annularly circumferential receptacle of the needle guide, the outer web of the seal being configured between its circumferential groove and its outer bearing surface, and for the seal to lie with an inner web between the needle guide and the shell surface of the valve needle, the inner web of the seal being configured between its circumferential groove and its inner bearing surface. As a result, a reliable sealing action can be produced by means of simple assembly in the axial direction.

Furthermore, it is provided for the valve needle to be supported, with the compression spring positioned in between, against an end of the valve body, which end lies opposite the nozzle opening. As a result, the nozzle opening is reliably closed when a trigger which actuates the needle is not actuated.

It is also provided for the securing element to be screwed into the valve body against the seal with a torque which lies between 0.75 Nm and 2 Nm. A torque range of this type is typically achieved even without a torque wrench, if it is specified with respect to an accompanying socket wrench that the securing element is to be tightened in a manner which is from medium to full. Therefore, the effort is reduced and the procedure is simplified.

Furthermore, it is provided for an inner shell surface of the tube end of the needle guide to be oriented in such a w that the inner shell surface of the tube end approaches toward the paint chamber circumferentially with respect to the valve needle. As a result of the shell surface which is oblique in this way, the inner web of the seal is guided against the shell surface of the needle during tightening of the securing element, and an increasing sealing action is achieved.

It is also provided that the inner shell surface of the pipe end lies at an angle α with respect to a longitudinal axis of the valve needle, a circumferential contact surface which is configured toward the groove of the seal on the inner web of the seal lying, during mounting of the seal before contact with the inner shell surface of the tube end, at an angle β with respect to the longitudinal axis of the valve needle, the angle β being smaller than the angle α and, in particular, being at most ⅔ of the angle β. Angles which are different in this way bring about spreading of the seal and, as a result, optimize its contact with the valve needle.

Finally, in relation to a longitudinal axis of the valve needle, circumferential contact (in the axial direction and in the radial direction) of the seal with the needle guide is provided and, furthermore, a positively locking connection of the seal and the needle guide is provided. As a result, reliable seating of the seal is achieved, by way of which a sealing action is maintained even when the seal warps and/or shrinks and/or moves on account of ageing. Furthermore, the seal remains in its position for a relatively long position even if the securing element should loosen.

Within the context of the present disclosure, an HVLP spray unit is to be understood to mean a spray unit which operates in accordance with what is known as the High Volume Low Pressure painting method with a high air volume and a low pressure.

Within the context of the present disclosure, other liquid media which behave like paint or in a similar manner to paint during spraying are also to be understood by the term “paint”.

Further details of the present disclosure will be described in the drawing on the basis of diagrammatically shown exemplary embodiments.

FIG. 1 shows a diagrammatic sectional illustration of an HVLP spray unit 1 according to one example, sectioned surfaces not being hatched in order to preserve the clarity.

The HVLP spray unit 1 is equipped with an electric fan 2 (indicated merely diagrammatically by way of dashed lines) and comprises a needle valve 3 for metering the paint F which is fed to an air cap 4 from a paint container 5. The needle valve 3 comprises a valve body 6 with an elongate interior space 7, a valve needle 8, a compression spring 9 and a seal 10. The valve body 6 is closed by way of the air cap 4.

The interior space 7 is configured as a paint chamber 12 between the seal 10 the nozzle opening 11 of the valve body 6, which nozzle opening 11 is configured in the air cap 4. A feed channel K opens into the paint chamber 12, through which feed channel K the paint F flows to the paint chamber from the paint container 5. The paint chamber 12 is flowed through in a spray direction x by the paint F during spray operation of the HVLP spray unit 1.

The interior space 7 of the valve body 6 is tapered between the feed channel K and the seal 10 in such a way that a needle guide 13 is formed. Lying opposite the paint chamber 12, the seal 10 is arranged so as to bear against the needle guide 13.

The valve body 6 is of multiple-part configuration and comprises a front part housing 14 which comprises the needle guide 13, and a rear part housing 15, in which the compression spring 9 is received. Furthermore, the valve body 6 comprises the air cap 4 which closes the front part housing 14 and has the nozzle opening 11. The two part housings 14, 15 can be separated from one another in the axial direction, with the result that after the removal of the rear part housing 15 the valve needle 8 can be pulled out of the front part housing 14 with a mounted seal 10. Here, the two part housings 14, 15 are screwed to one another. In accordance with design variants which are not shown, it can also be provided that the two part housings are connected releasably and reclosably by means of a bayonet cap or by means of a plug-in cap or by means of at least one tensioning lever.

Figure 2:
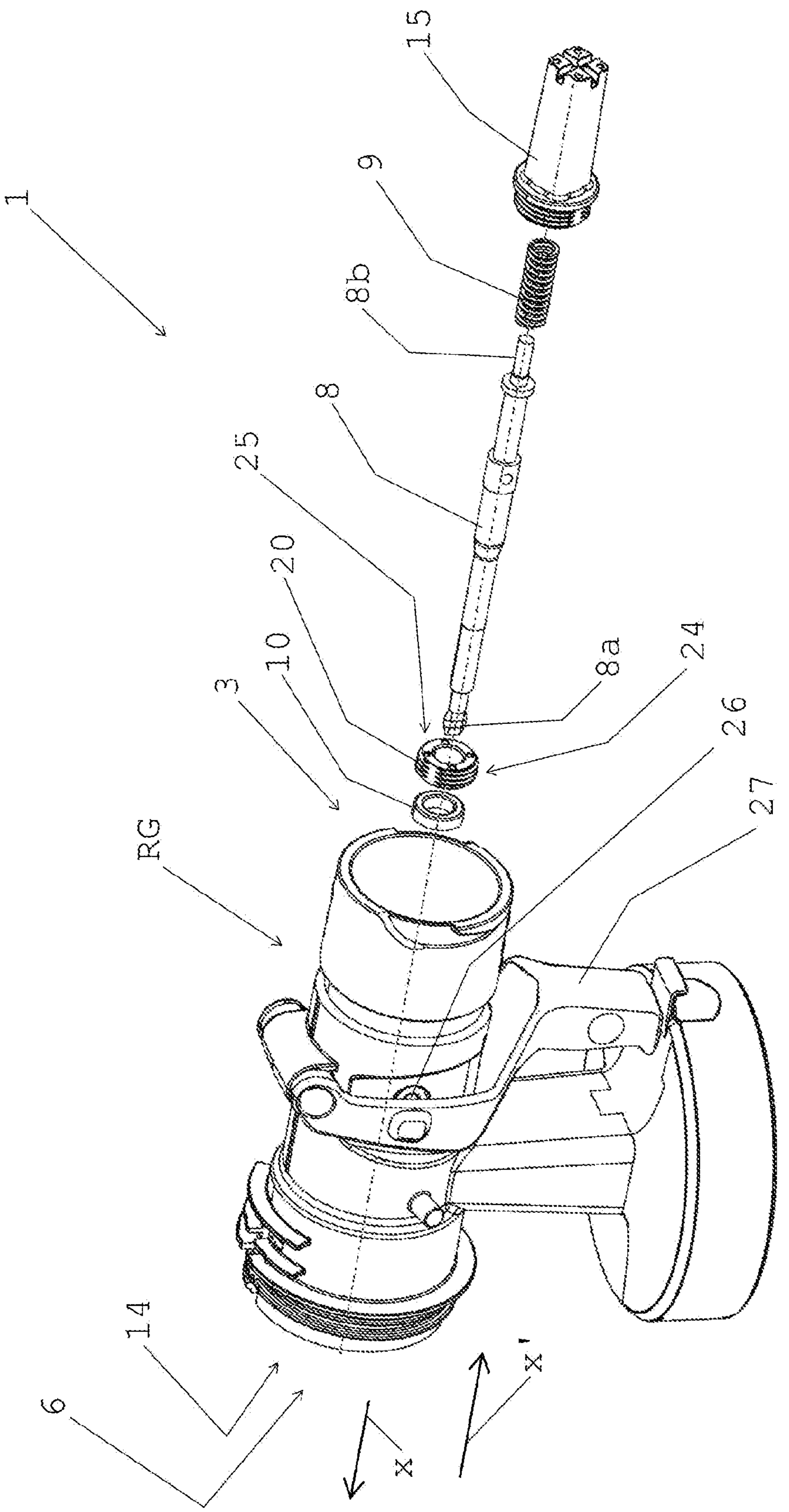
FIG. 2 shows the HVLP spray unit illustrated in FIG. 1 in a perspective exploded illustration with a hidden air cap and with a screwed-off paint container, in one example.

FIG. 2 shows the HVLP spray unit 1 (illustrated in FIG. 1) incompletely and in a perspective exploded illustration with a hidden air cap and with a screwed-off paint container. It can be seen from this exploded view how, during the assembly of the needle valve 3, the seal 10 is first of all pushed into the front part housing 14 of the valve body 6, the securing element 20 is then screwed into the front part housing 14, the valve needle 8 is then pushed through the seal 10, the compression spring 9 is then plugged onto a free end **8*b* of the valve needle 8, and finally the rear part housing 15 is screwed onto the front part housing 14 while receiving the compression spring 9 and the free end 8*b* of the valve needle 8, until the valve needle 8 closes the nozzle opening, configured in the hidden air cap, by way of its needle head 8*a***.

The component, in and on which the valve body 6 of the needle valve 3 is received, is called a body housing RG of the HVLP spray unit 1.

Figure 3:
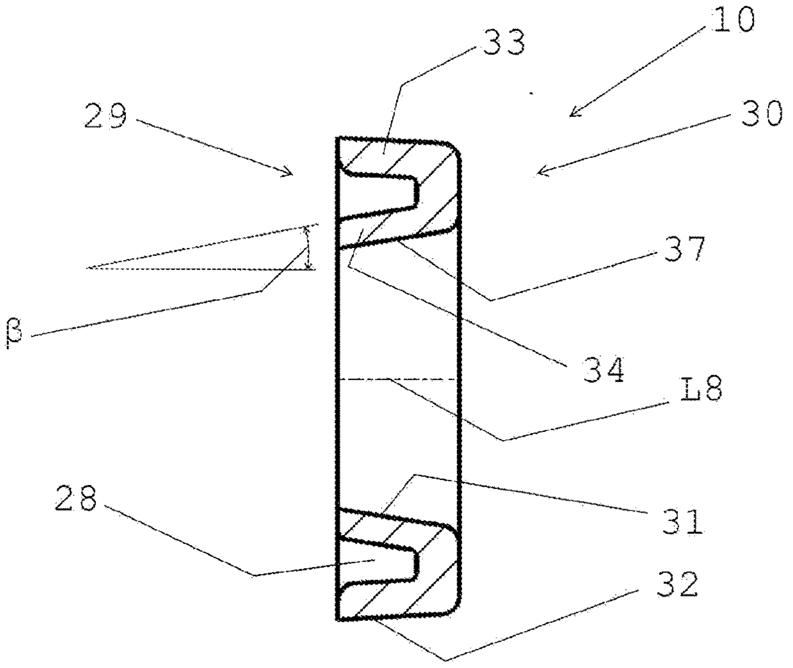
FIG. 3 shows a sectional illustration of a seal of the HVLP spray unit, in one example.

FIG. 3 shows the seal 10 of the HVLP spray unit in section.

Figure 4:
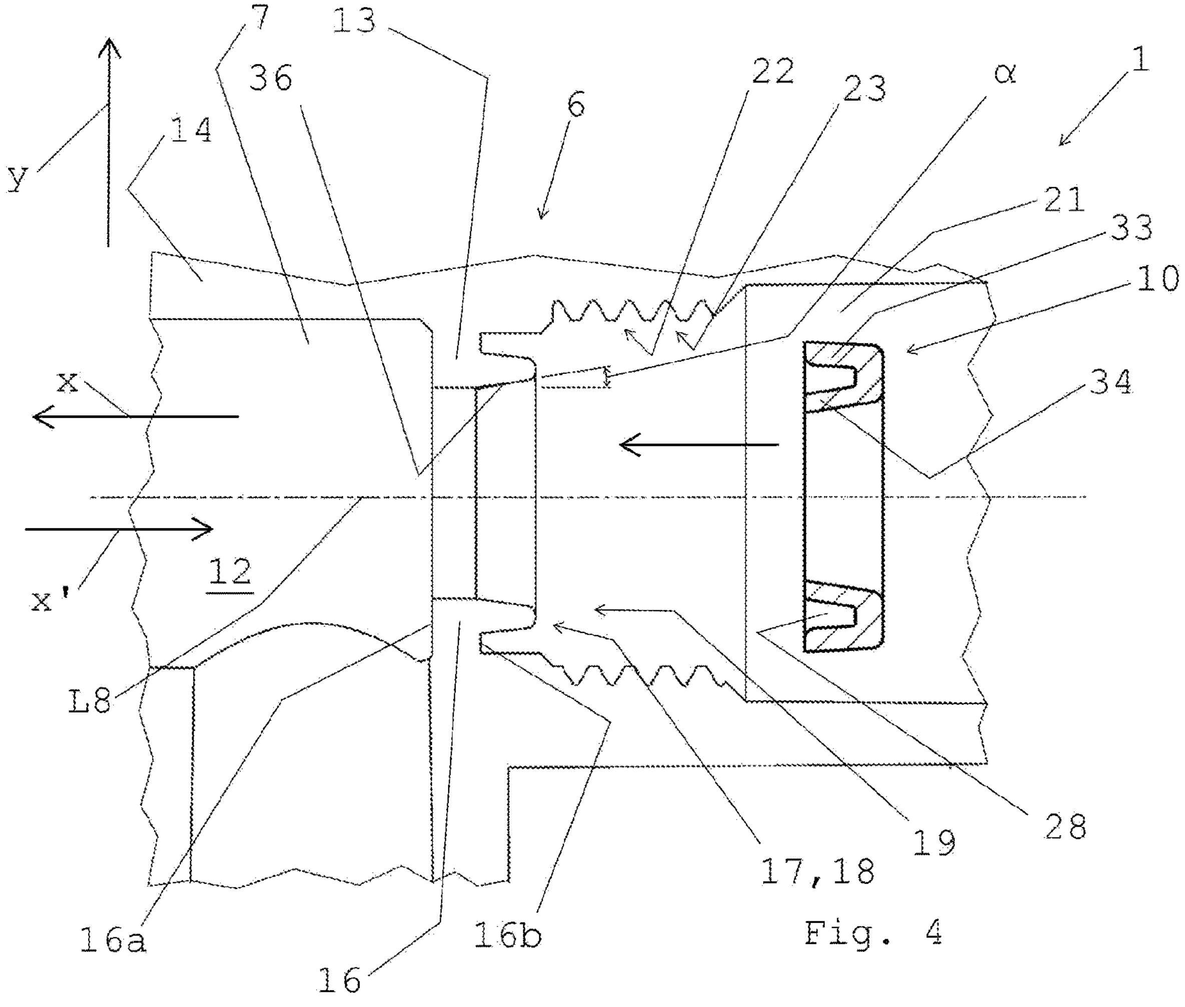
FIG. 4 shows a detailed view of the HVLP spray unit shown in FIG. 1 in the region of a needle guide, a valve needle and a securing element being hidden, and the seal to be mounted being shown diagrammatically.

FIG. 4 shows a detailed view of the HVLP spray unit 1 (shown in FIG. 1) in the region of the needle guide 13, the valve needle and the securing element being hidden, and the seal 10 to be mounted being shown diagrammatically.

Figure 5:
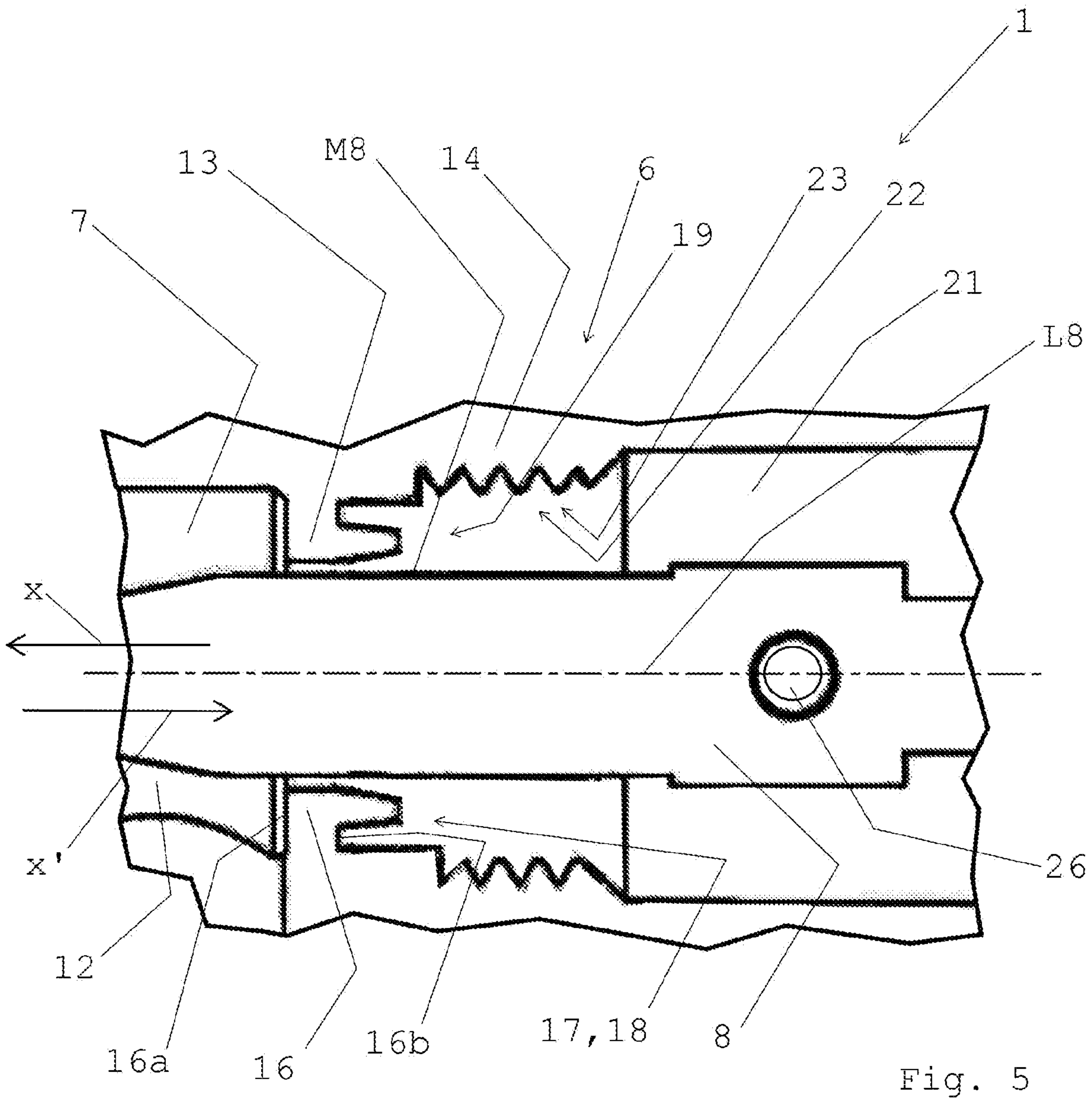
FIG. 5 shows a detailed view comparable to FIG. 4, the valve needle being shown, and the securing element and the seal being hidden.

FIG. 5 shows a detailed view (comparable with FIG. 4) of the HVLP spray unit 1, the valve needle 8 being shown, and the securing element and the seal being hidden.

As can be seen, in particular, from the enlarged detailed illustrations of FIGS. 4 and 5, the valve body 6, in order to form the needle guide 13 in its interior space 7, comprises a circumferential collar 16, the valve body 6 comprising, furthermore, a circumferential flange 17 in order to form the needle guide 13. Here, the flange 17 is configured in the form of a tube end 18 on a rear end surface **16*b* of the collar 16. The rear end surface 16*b* faces away from the paint chamber 12. A front end surface 16*a* of the collar 16 faces the paint chamber 12**.

An annularly circumferential receptacle 19 is configured by way of the described needle guide 13.

The seal 10 is arranged between the securing element 20 and the needle guide 13 (see FIG. 1), the seal 10 being squeezed between the securing element 20 and the needle guide 13 for operation of the HVLP spray unit 1 (see FIG. 1), with the result that this seal 10 seals an actuation chamber 21, lying behind the needle guide 13 as viewed in the spray direction x, with respect to the paint chamber 12 around the valve needle 8.

In order for it to be possible for pressure to be built up on the seal 10 and against the needle guide 13, the securing element 20 (see FIG. 1) is supported on an inner shell surface 20 (see, in particular, FIGS. 4 and 5) of the interior space 7 of the valve body 6. This support takes place by way of a positively locking connection, the securing element 20 being screwed into the valve body 6. To this end, the inner shell surface 22 of the interior space 7 has an internal thread 23 behind the needle guide 13 and, to this end, the securing element 20 has an external thread 24 (see FIG. 2) which fits the internal thread 23. A receptacle 25 for a socket wrench (not shown) is configured on the securing element 20. The receptacle is formed by way of four bores, as can be seen from FIG. 2. The matching socket wrench is then configured, for example, as a tube with four pins which are arranged on the end side, and can be plugged, in the case of a removed rear part housing 15 and a removed compression spring 9, even in the case of a valve needle 8 which is plugged into the paint chamber 12, into the receptacle 25, formed by way of the four bores, of the securing element 20 with receiving of the valve needle 9, in order to screw it into the front part housing 14 of the valve body 6 or to screw it out of the front part housing 14 of the valve body 6. It goes without saying that a cross bolt 26 (see FIGS. 1, 2 and 5), via which the valve needle 8 is connected to a trigger 27 (see FIGS. 1 and 2) of the HVLP spray unit 1, has to be pulled out of the valve needle 8 if the socket wrench (not illustrated) is used.

The seal 10 which is shown on its own in FIG. 3 is configured in the manner of a shaft seal with a circumferential groove 28. The groove 28 opens toward one of two end sides 29, 30 of the seal 10, namely toward the left-hand end side 29. The end side 29 which is configured in a similar manner to two concentric circular rings and the end side 30 which is configured in a similar manner to a single circular ring are configured between an inner bearing surface 31 of the seal 10 and an outer bearing surface 32 of the seal 10.

As is indicated in FIG. 4 by way of an arrow which points in the spray direction x, the seal 10 is pushed on during assembly with a groove 28 which points in the direction of the circumferential receptacle 19 of the needle guide 13. Here, the seal 10 is placed with an outer web 13 into the annularly circumferential receptacle 19 of the needle guide 13, the outer web 33 of the seal 10 being configured between its circumferential groove 28 and its outer bearing surface 32. Here, the seal 10 is placed with an inner web 34 between the needle guide 13 and a shell surface M8 of the valve needle 8, the inner web 34 of the seal 10 being configured between its circumferential groove 28 and its inner bearing surface 31. With respect to the described procedure, reference is made to a combined consideration of FIGS. 4 and 5, since the valve needle is hidden in FIG. 4 in order to preserve the clarity. Conversely, the valve needle 8 is shown and the seal 10 is hidden in FIG. 5. Furthermore, reference is made in this regard to FIG. 1.

In respect of the overall construction of the HVLP spray unit 1, it can be seen from FIG. 1 how the valve needle 8 is supported, with the compression spring 9 placed in between, against an end 35, lying opposite the nozzle opening 11, of the valve body 6 or rear part housing 15.

In order to achieve a desired sealing action and to seal the actuation chamber 21 despite the valve needle 8 moving in the spray direction x or counter to the spray direction x in the counter-spray direction x' upon actuation by way of the trigger 27, the securing element 20 is screwed into the valve body 6 against the seal 10 with a torque which lies between 0.75 Nm and 2 Nm.

As can be seen from the comparative consideration of FIGS. 4 and 5, an inner shell surface 36 of the tube end 18 of the needle guide 13 approaches toward the paint chamber 12 circumferentially with respect to the valve needle 8, and forms a shell surface of a truncated cone. Accordingly, the inner shell surface 36 of the tube end 18 lies at an angle $\alpha$ with respect to a longitudinal axis 58 of the valve needle 8. A circumferential contact surface 37 which is configured toward the groove 28 of the seal 10 on the inner web 34 of the seal 10 and is formed by way of the inner bearing surface 31 of the seal 10 is at an angle $\beta$ (see FIG. 3) with respect to the longitudinal axis 58 of the valve needle 8 during the mounting of the seal 10 before contact with the inner shell surface 36 of the tube end 18. Here, the angle $\beta$ is smaller than the angle $\alpha$. The seal 10 is spread apart by way of the seal 10 being pushed onto the needle guide 13. In this way, the inner web 34 bears particularly satisfactorily against the shell surface M8 of the valve needle 8.

The mounted seal 10 which is clamped in by means of the securing element 20 bears against the needle guide 13 both circumferentially in the axial direction x and circumferentially in the radial direction y, and is also connected in a positively locking manner to this needle guide 13 (see FIGS. 4 and 1). In the finally mounted state of the seal 10, the groove 28 of the seal 10 is seated under pressure on the circumferential receptacle 19 of the needle guide 13.

Although the present invention has been described with reference to preferred embodiments, workers skilled in the art will recognize that changes may be made in form and detail without departing from the spirit and scope of the invention.

LIST OF REFERENCE SIGNS

1 HVLP spray unit
2 Electric fan
3 Needle valve
4 Air cap
5 Paint container
6 Valve body
7 Interior space
8 Valve needle
8*a* Needle head of 8
8*b* Free end of 8
9 Compression spring
10 Seal
11 Nozzle opening
12 Paint chamber
13 Needle guide
14 Front part housing of 6
15 Rear part housing of 6
16 Collar
16*a* Front end surface of 16
16*b* Rear end surface of 16
17 Flange
18 Tube end
19 Circumferential receptacle formed by way of 13

20 Securing element
21 Actuation chamber
22 Inner shell surface of 7
23 Internal thread on 22 of 7
24 External thread on 20
25 Receptacle on 20 for socket wrench
26 Cross bolt
27 Trigger
28 Groove in 10
29 Left-hand end side of 10
30 Right-hand end side of 10
31 Inner bearing surface of 10
32 Outer bearing surface of 10
33 Outer web of 10
34 Inner web of 10
35 End of 6 lying opposite 11
36 Inner shell surface of 18
37 Contact surface on 34
α Angle between 36 and L8
β Angle between L8 and 37
F Paint
K Feed channel
L8 Longitudinal axis of 8
M8 Shell surface of 8
RG Body housing of 1
x Spray direction/axial direction
x' Counter-spray direction
y Radial direction

The invention claimed is:

1. A HVLP spray unit with an electric fan comprising:
- a needle valve for metering paint which is fed to an air cap,
- the needle valve comprising a valve body with an elongate interior space, a valve needle, a compression spring, and a seal component having a groove,
- the elongate interior space between the seal component and a nozzle opening of the valve body being configured as a paint chamber, into which a feed channel for the paint opens and which is flowed through by the paint during spray operation of the HVLP spray unit,
- wherein the elongate interior space of the valve body is tapered between the feed channel and the seal component in such a way that a needle guide is formed,
- wherein the seal component lies opposite to the paint chamber and is arranged so as to bear against the needle guide,
- wherein the needle guide comprises a circumferential collar having a circumferential flange that receives the groove of the seal component, and
- wherein the groove of the seal component comprises an outer web and an inner web, and the circumferential flange receives the outer web and the inner web.

2. The HVLP spray unit according to claim 1, wherein the circumferential flange is in the form of a tube end on an end surface of the circumferential collar, the end surface facing away from the paint chamber.

3. The HVLP spray unit according to claim 1, wherein
- the seal component is arranged between a securing element and the needle guide, and
- the seal component is squeezed between the securing element and the needle guide.

4. The HVLP spray unit according to claim 3, wherein
- the securing element is supported on an inner shell surface of the elongate interior space of the valve body, the securing element is supported, in particular, by way of a positively locking connection, and the securing element being screwed, in particular, into the valve body, and
- the inner shell surface of the elongate interior space has an internal thread behind the needle guide, and the securing element has an external thread which fits the internal thread.

5. The HVLP spray unit according to claim 1, wherein
- the valve body is of multiple-part configuration,
- the valve body comprises a front part housing which supports the air cap with the nozzle opening and comprises the needle guide, and
- the valve body comprises a rear part housing, in which the compression spring is received, wherein the front part housing and rear part housing form a two part housing,
- the two part housing configured to be separated from one another in an axial direction in such a way that after removal of the rear part housing, the valve needle can be pulled out of the front part housing with the seal component mounted, and
- the front part housing and the rear part housing being screwed to one another.

6. The HVLP spray unit according to claim 1, wherein the groove of the seal component comprises an opening, wherein the opening is open to one of two end sides of the seal component, the two end sides lying between an inner bearing surface of the seal component and an outer bearing surface of the seal component.

7. The HVLP spray unit according to claim 6, wherein
- an annularly circumferential receptacle is configured by way of the needle guide,
- the seal component is seated with the outer web in the annularly circumferential receptacle of the needle guide, the outer web of the seal component being configured between the groove of the seal component and the outer bearing surface of the seal component, and
- the seal component lies with the inner web between the needle guide and a shell surface of the valve needle, the inner web of the seal component being configured between the groove of the seal component and the inner bearing surface of the seal component.

8. The HVLP spray unit according to claim 1, wherein the valve needle is supported, with the compression spring positioned in between, against an end of the valve body, the end of the valve body lies opposite the nozzle opening.

9. The HVLP spray unit according to claim 4, wherein the securing element is screwed into the valve body against the seal component with a torque which lies between 0.75 Nm and 2 Nm.

10. The HVLP spray unit according to claim 1, wherein an inner shell surface of a tube end of the needle guide is oriented in such a way that the inner shell surface of the tube end extends toward the paint chamber.

11. The HVLP spray unit according to claim 10, wherein the inner shell surface of the tube end of the needle guide lies at a first angle with respect to a longitudinal axis of the valve needle, a circumferential contact surface which is configured toward the groove of the seal component on the inner web of the seal component lying, during mounting of the seal component before contact with the inner shell surface of the tube end of the needle guide, at a second angle with respect to the longitudinal axis of the valve needle, the second angle being smaller than the first angle and, in particular, being at most ⅔ of the first angle.

12. The HVLP spray unit according to claim 1, wherein the seal component bears against the needle guide circumferentially in an axial direction and in a radial direction in relation to a longitudinal axis of the valve needle, and is connected to the needle guide.

13. The HVLP spray unit according to claim 1, wherein the inner web of the seal component has an outer bearing surface and an inner bearing surface, and wherein the inner bearing surface is tapered towards the nozzle opening.

14. A HVLP spray unit with an electric fan comprising:

a needle valve configured to meter a flow of paint which is fed to an air cap, the needle valve including a valve body with an elongate interior space, a needle, a compression spring, and a seal component having a groove;

a paint chamber formed within the elongate interior space between the seal component and a nozzle opening of the valve body, wherein the flow of paint travels through a feed channel of the paint chamber during a spray operation of the HVLP spray unit;

a needle guide formed by a portion of the elongate interior space that tapers toward the nozzle opening;

wherein the needle guide comprises a circumferential collar having a circumferential flange;

wherein the circumferential flange is configured to receive the groove of the seal component; and wherein the groove of the seal component includes an outer web and an inner web, and wherein the circumferential flange is configured to receive the outer web and the inner web.

15. The HVLP spray unit of claim 14, wherein, during the spray operation of the HVLP spray unit, the seal component is coupled to the circumferential collar.

16. The HVLP spray unit of claim 14, wherein the outer web is substantially opposite from the inner web.

17. The HVLP spray unit of claim 14, wherein the inner web of the seal component has an outer bearing surface and an inner bearing surface, the inner bearing surface being tapered towards the nozzle opening.

18. A HVLP spray unit with an electric fan comprising:

a needle valve for metering paint which is fed to an air cap;

the needle valve comprising a valve body with an elongate interior space, a valve needle, a compression spring, and a seal component having a groove;

the elongate interior space between the seal component and a nozzle opening of the valve body being configured as a paint chamber, into which a feed channel for the paint opens and which is flowed through by the paint during spray operation of the HVLP spray unit;

wherein the elongate interior space of the valve body is tapered between the feed channel and the seal component in such a way that a needle guide is formed;

wherein the seal component lies opposite to the paint chamber and is arranged so as to bear against the needle guide;

wherein the needle guide comprises a circumferential collar having a circumferential flange that receives the groove of the seal component; and wherein an annularly circumferential receptacle is configured by way of the needle guide.

* * * * *